US006614495B1

(12) United States Patent
Zander

(10) Patent No.: US 6,614,495 B1
(45) Date of Patent: Sep. 2, 2003

(54) LIQUID CRYSTAL DISPLAY UNIT FOR CAMERA, INCLUDING MESSAGE BEARING MEDIUM, BACK LIGHT SOURCE, AND PROTECTIVE COVER

(75) Inventor: Dennis R. Zander, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/547,569

(22) Filed: Apr. 12, 2000

(51) Int. Cl.[7] ............... G02F 1/1333; G02F 1/1335; G03B 17/18
(52) U.S. Cl. ............... 349/58; 349/61; 349/63; 396/287
(58) Field of Search ............... 349/58, 61, 63; 396/287, 291, 292; 348/333.01–333.04

(56) References Cited

U.S. PATENT DOCUMENTS

| 4,647,176 A | * | 3/1987 | Shimizu et al. ............ 396/212 |
| 4,656,466 A | | 4/1987 | Yoshida et al. ............ 340/716 |
| 4,990,944 A | | 2/1991 | Yamamoto et al. ..... 354/173.11 |
| 5,168,384 A | * | 12/1992 | Genba ..................... 348/790 |
| 5,309,194 A | | 5/1994 | Itabashi .................... 354/471 |
| 5,432,578 A | | 7/1995 | Suzuki .................. 354/289.12 |
| 5,555,064 A | | 9/1996 | Machida ................ 354/289.12 |
| 5,649,244 A | | 7/1997 | Sato et al. ................. 396/287 |
| 5,946,507 A | | 8/1999 | Akami et al. .............. 396/287 |
| 6,115,557 A | * | 9/2000 | Maeda et al. ............ 358/909.1 |
| 6,330,150 B1 | * | 12/2001 | Kim ............................. 349/58 |
| 2002/0031345 A1 | * | 3/2002 | Miyamoto .................. 396/287 |

* cited by examiner

Primary Examiner—Toan Ton
Assistant Examiner—Tarifur R. Chowdhury
(74) Attorney, Agent, or Firm—Roger A. Fields

(57) ABSTRACT

A liquid crystal display unit for a camera has a liquid crystal display panel and a back light source panel arranged along a back side of the liquid crystal display panel to illuminate the liquid crystal display panel. The back light source panel has a panel portion that extends farther than the back side of the liquid crystal display panel to be located beyond the back side in order to provide illumination other than to the back side when the back light source panel illuminates the liquid crystal display panel. A transparent protective cover panel covers a front side of the liquid crystal display panel to view the liquid crystal panel through the protective cover panel and has a panel portion that extends farther than the front side of the liquid crystal display panel to cover the panel portion of the back light source panel in order to permit illumination from the panel portion of the back light source panel to shine through the panel portion of the protective cover panel. A first message bearing medium is arranged between the panel portion of the back light source panel and the panel portion of the protective cover panel and a second message bearing medium has an adhesive backing to permit the second message bearing medium to be placed on the panel portion of the protective cover panel.

9 Claims, 2 Drawing Sheets

LIQUID CRYSTAL DISPLAY UNIT FOR CAMERA, INCLUDING MESSAGE BEARING MEDIUM, BACK LIGHT SOURCE, AND PROTECTIVE COVER

CROSS REFERENCE TO RELATED APPLICATION

Reference is made to commonly assigned copending application Ser. No. 09/286,176, entitled EL BACKLIGHT DRIVE CIRCUIT FOR LCD DISPLAY and filed Apr. 5, 1999 in the names of Paul Teremy and Dennis R. Zander.

FIELD OF THE INVENTION

The invention relates generally to the field of photography, and in particular to liquid crystal display units for cameras.

BACKGROUND OF THE INVENTION

Liquid crystal display (LCD) panels are often used in cameras to provide various mode messages or information corresponding to different operation modes of the camera.

Any one of the mode messages appearing on the LCD panel can be easily read in normal daylight ambient conditions. However, since the LCD panel does not generate light by itself, it would be difficult in low light or dark ambient conditions to read the mode messages. Thus, it is well known to back light the LCD panel using a back light source panel which is arranged at a back side of the liquid crystal display panel to illuminate the liquid crystal display panel when required. See prior art U.S. Pat. No. 5,946,507 issued Aug. 31, 1999, and U.S. Pat. No. 5,649,244 issued Jul. 15, 1997, which are incorporated in this application.

Typically, the LCD panel is referred to as being "transflective" which as is known means it is light-reflective in normal daylight ambient conditions and is light-transmissive when backlighted in low-light or dark ambient conditions.

The Cross-Referenced Application

The cross-referenced application discloses a drive circuit for an electroluminescent (EL) back light source for an LCD panel in a camera. The drive circuit connects the EL back light source to a flash capacitor in the camera which serves as a DC power source for the EL back light source.

SUMMARY OF THE INVENTION

Broadly speaking, a liquid crystal display unit for a camera comprising a liquid crystal display panel that is illuminated to facilitate viewing at least one message which can appear on the liquid crystal display panel, and a back light source panel arranged to illuminate the liquid crystal display panel, is characterized in that:

a message bearing medium is arranged to be illuminated to facilitate viewing at least one message provided on the medium in conjunction with viewing at least one message appearing on the liquid crystal display panel; and the back light source panel has a major panel portion that illuminates the liquid crystal display panel and a minor panel portion that illuminates the message bearing medium simultaneously.

More specifically, a liquid crystal display unit for a camera comprising a liquid crystal display panel that is illuminated to facilitate viewing at least one message which can appear on the liquid crystal display panel, and a back light source panel arranged along a back side of the liquid crystal display panel to illuminate the liquid crystal display panel, is characterized in that:

the back light source panel has a panel portion that extends farther than the back side of the liquid crystal display panel to be located beyond the back side in order to provide illumination other than to the back side when the back light source panel illuminates the liquid crystal display panel;

a transparent protective cover panel covers a front side of the liquid crystal display panel to view the liquid crystal panel through the protective cover panel and has a panel portion that extends farther than the front side of the liquid crystal display panel to cover the panel portion of the back light source panel in order to permit illumination from the panel portion of the back light source panel to shine through the panel portion of the protective cover panel;

a first message bearing medium is arranged between the panel portion of the back light source panel and the panel portion of the protective cover panel to be illuminated via the panel portion of the back light source panel in order to facilitate viewing through the panel portion of the protective cover panel at least one message provided on the first message bearing medium; and a second message bearing medium has an adhesive backing to permit the second message bearing medium to be placed on the panel portion of the protective cover panel to be illuminated via the panel portion of the back light source panel in order to facilitate viewing through the panel portion of the protective cover panel at least one message provided on the second message bearing medium.

Preferably, the second message bearing medium when placed on the panel portion of the protective cover panel covers the first message bearing medium to prevent the first message bearing medium from being viewed through the panel portion of the protective cover panel. This is necessary when at least one message provided on the second message bearing medium is in a different language than a similar message provided on the first message bearing medium.

DETAILED DESCRIPTION OF THE INVENTION

The invention is disclosed as being embodied preferably in a motorized film-advance camera. Because the features of a motorized film-advance camera are generally known, the description which follows is directed in particular only to those elements forming part of or cooperating directly with the disclosed embodiment. It is to be understood, however, that other elements may take various forms known to a person of ordinary skill in the art.

Figure 1:
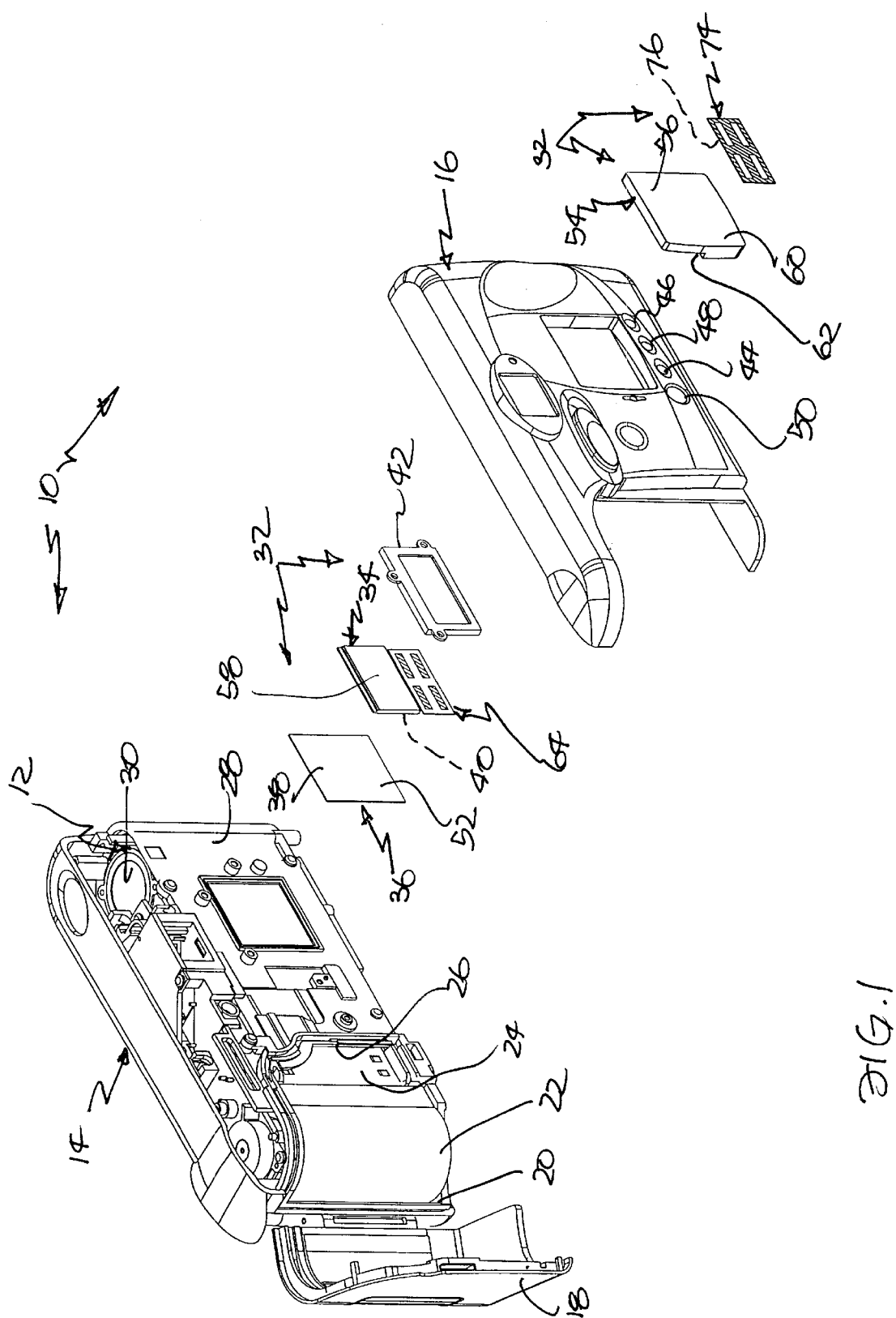
FIG. 1 is a rear exploded perspective view of a camera with a liquid crystal display unit.

Referring now to the drawings, FIG. 1 shows a motorized film-advance camera 10 including a plastic opaque main body part 12, and a pair of plastic opaque front and rear housing parts 14 and 16 that contain the main body part.

A film door 18 is pivotally connected to the front housing part 14 to be pivoted open to gain access to a cartridge receiving chamber 20 in the main body part 12 and to be pivoted closed to close the chamber. The camera 10 is used with a conventional 35 mm film cartridge 22 having a protruding film leader 24. Film loading in the camera 10 is accomplished by pivoting the film door 18, open, inserting the film leader 24 into a slot 26 in the main body part 12, pushing the film cartridge 22 into the cartridge receiving chamber 20, and closing the film door to start a motorized automatic film advance (not shown). The motorized film advance advances the film leader 24 beneath a film pressure platen 28, secured to the main body part 12, and to a film take-up chamber 30 in the main body part.

Figure 2:
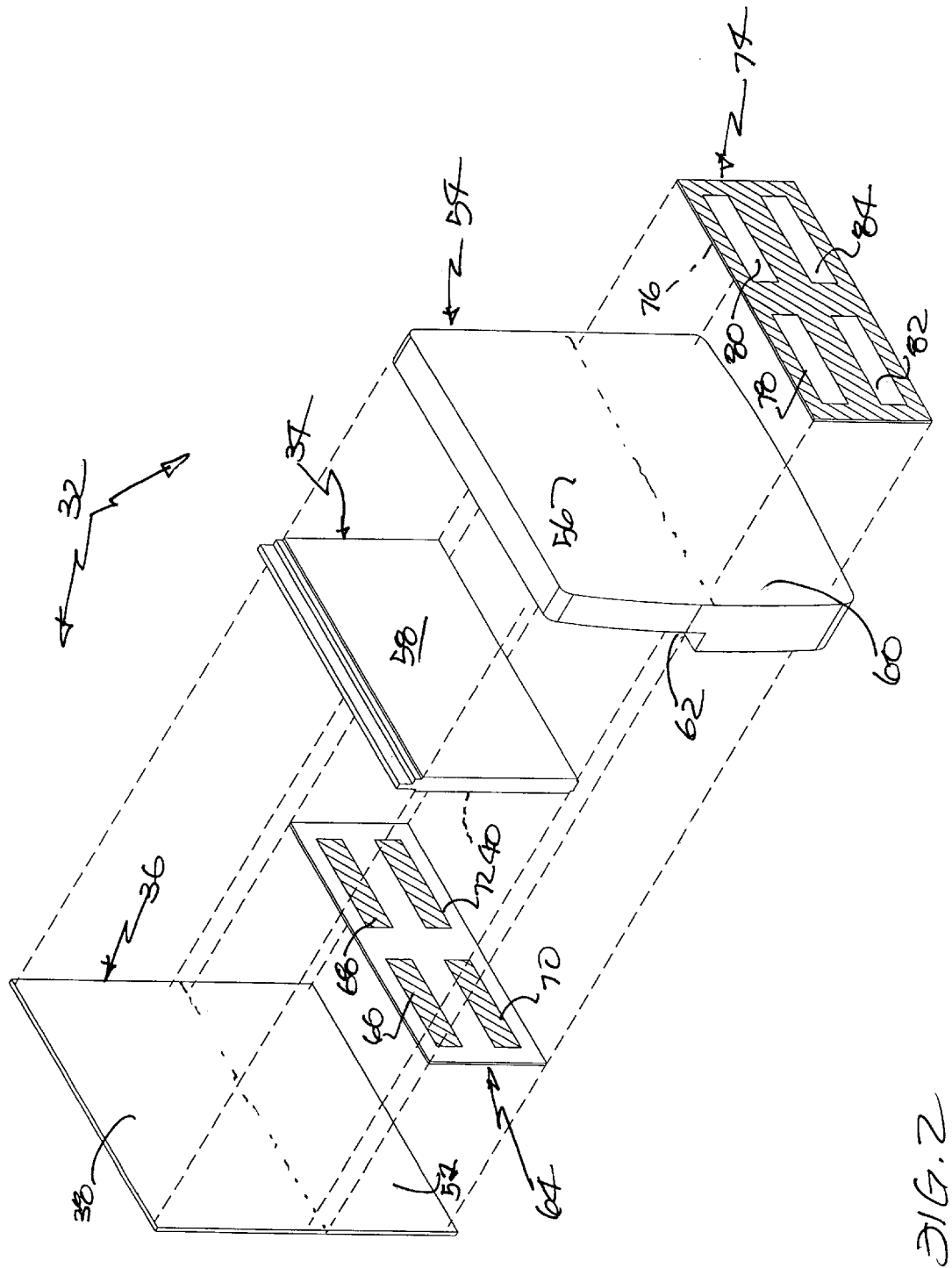
FIG. 2 is an enlarged exploded perspective view of the liquid crystal display unit.

As shown in FIGS. 1 and 2, a liquid crystal display (LCD) unit 32 for the camera 10 has a known transflective liquid crystal display panel 34 that is illuminated to facilitate viewing at least one message which can appear on the liquid crystal display panel, and a known electroluminescent (EL) back light source panel 36 that has a major panel portion 38 arranged along a back side 40 of the liquid crystal display panel to illuminate the liquid crystal display panel. The term "transflective" means that the liquid crystal panel 34 is light-reflective in normal daylight ambient conditions and is light-transmissive when backlighted in low-light or dark (nighttime) ambient conditions. A frame 42 is secured to the film pressure platen 28 to hold the liquid crystal display panel 34 against the major portion 38 of the back light source panel 36.

The liquid crystal display panel 34 preferably produces various mode messages or information corresponding to different operation modes of the camera 10. For example, these mode messages can include a flash-off symbol, a fill-flash symbol, and a nightview symbol which are alternatively selected by pressing an exposure mode rear button 44 at the rear cover part 16, a self-timer symbol which is selected by pressing a self-timer rear button 46 at the rear cover part, a portrait symbol and an infinity-focus symbol which are alternatively selected by pressing a focus-mode rear button 48 at the rear cover part, and a film rewind symbol which occurs when the filmstrip is rewound into the film cartridge 22.

The back light source panel 36 can be turned on and off by pressing a back light rear button 50 on the rear cover part 16. Cross-referenced application Ser. No. 09/286,176 discloses a drive circuit for the back light source panel 36, and is incorporated in this application. The drive circuit connects the back light source panel 36 to a flash capacitor (not shown) in the camera 10 which serves as a DC power source for the back light source panel.

As shown in FIG. 2, the back light source panel 34 has a minor panel portion 52 that is coplanar with the major panel portion 38 of the back light source panel and extends farther than the back side 40 of the liquid crystal display panel 34 to be located beyond the back side in order to provide illumination other than to the back side when the back light source panel illuminates the liquid crystal display panel.

A transparent protective cover panel 54 has a major panel portion 56 that covers a front side 58 of the liquid crystal display panel 34 to view the liquid crystal panel through the protective cover panel and has a minor panel portion 60 that extends farther than the front side of the liquid crystal display to cover the minor panel portion 52 of the back light source panel 36 in order to permit illumination from the minor panel portion of the back light source panel to shine through the minor panel portion of the protective cover panel. The major panel portion 56 of the protective cover panel 54 is relieved with respect to the minor panel portion 60 of the protective cover panel to define a recess 62 for the liquid crystal display panel 34. See FIG. 2.

A first message bearing medium 64 is arranged between the minor panel portion 52 of the back light source panel 36 and the minor panel portion 60 of the protective cover panel 54 to be illuminated via the minor panel portion of the back light source panel in order to facilitate viewing through the minor panel portion of the protective cover panel any one of four imprinted messages 66, 68, 70 and 72 provided on the first message bearing medium. The first message bearing medium 64 is light transmissive except at the four messages 66, 68, 70 and 72 which are opaque. The respective messages 66, 68, 70 and 72 are "exposure", "timer", "focus" and "rewind" and they correspond to the flash-off symbol, the fill-flash symbol, and the nightview symbol which are alternatively selected by pressing the exposure mode rear button 44, the self-timer symbol which is selected by pressing the self-timer rear button 46, the portrait symbol and the infinity-focus symbol which are alternatively selected by pressing the focus-mode rear button 48, and the film rewind symbol which occurs when the filmstrip is rewound into the film cartridge 22.

An optional-use, second message bearing medium 74 has an adhesive backing 76 to permit the second message bearing medium to be manually placed on the minor panel portion 60 of the protective cover panel 54 to be illuminated via the minor panel portion 52 of the back light source panel 36 in order to facilitate viewing through the minor panel portion of the protective cover panel any one of four imprinted messages 78, 80, 82 and 84 provided on the second message bearing medium. The respective messages 78, 80, 82 and 84 are foreign language equivalent of the four messages 66, 68, 70 and 72 provided on the first message bearing medium 64. The second message bearing medium 74 is opaque except at the four messages 78, 80, 82 and 84 which are translucent. When the second message bearing medium 74 is placed on the minor panel portion 60 of the protective cover panel 54, as indicated in FIG. 2, it covers the first message bearing medium 64 to prevent the first message bearing medium from being viewed through the minor panel portion of the protective cover panel.

The invention has been described with reference to a preferred embodiment. However, it will be appreciated that variations and modifications can be effected by a person of ordinary skill in the art without departing from the scope of the invention.

PARTS LIST 10. camera
12. main body part
14. front cover part
16. rear cover part
18. film door
20. cartridge receiving chamber
22. film cartridge
24. film leader
26. slot
28. filmpressure platen
30. film take-up chamber
32. liquid crystal display unit
34. liquid crystal display panel
36. back light source panel
38. major panel portion
40. back side
42. frame
44. exposure-mode rear button 46. self-timer rear button
48. focus-mode rear button
50. back light rear button
52. minor panel portion
54. protective cover panel
56. major panel portion
58. front side
60. minor panel portion
62. recess
64. first message bearing medium
66. message
68. message
70. message
72. message
74. second message bearing medium
76. adhesive backing
78. message
80. message
82. message
84. message

What is claimed is:

1. A liquid display unit for a camera comprising a liquid crystal display panel that is illuminated to facilitate viewing at least one message which can appear on said liquid crystal display panel, and a back light source panel arranged along a back side of said liquid crystal display panel to illuminate the liquid crystal display panel, is characterized in that:

a message bearing medium is arranged to be illuminated to facilitate viewing at least one message provided on said medium in conjunction with viewing at least one message appearing on said liquid crystal display panel;

said back light source panel has a panel portion that extends farther than said back side of the liquid crystal display panel to be located beyond said back side in order to illuminate said message bearing medium when said back light source panel illuminates said liquid crystal display panel; and a transparent protective cover panel covers a front side of said liquid crystal display panel to view said liquid crystal panel through said transparent protective cover panel and has a panel portion that extends farther than said front side of the liquid crystal display panel to cover said panel portion of the back light source panel in order to permit illumination from said panel portion of the back light source panel to shine through said panel portion of the protective cover panel.

2. A liquid crystal display unit as recited in claim 1, wherein said message bearing medium is between said panel portion of the back light source panel and said panel portion of the protective cover panel.

3. A liquid crystal display unit as recited in claim 2, wherein said message bearing medium is light transmissive except for least one message provided on said message bearing medium which is opaque.

4. A liquid crystal display unit as recited in claim 1, wherein said message bearing medium is on said panel portion of the protective cover panel.

5. A liquid crystal display unit for a camera comprising a liquid crystal display panel that is illuminated to facilitate viewing at least one message which can appear on said liquid crystal display panel, and a back light source panel arranged along a back side of said liquid crystal display panel to illuminate the liquid crystal display panel, is characterized in that:

said back light source panel has a panel portion that extends farther than said back side of the liquid crystal display panel to be located beyond said back side in order to provide illumination other than to said back side when said back light source panel illuminates said liquid crystal display;

a transparent protective cover panel covers a front side of said liquid crystal display panel to view said liquid crystal panel through said protective cover panel and has a panel portion that extends farther than said front side of the liquid crystal display panel to cover said panel portion of the back light source panel in order to permit illumination from said panel portion of the back light source panel to shine through said panel portion of the protective cover panel;

a first message bearing medium is arranged between said panel portion of the back, light source portion and said panel portion of the protective cover panel to be illuminated via said panel portion of the back light source portion in order to facilitate viewing through said panel portion of the protective cover panel at least one message provided on said first message bearing medium; and a second message bearing medium has an adhesive backing to permit said second message bearing medium to be placed on said panel portion of the protective cover panel to be illuminated via said panel portion of the back light source portion in order to facilitate viewing through said panel portion of the protective cover panel at least one message provided on said second message bearing medium.

6. A liquid crystal display unit as recited in claim 5, wherein said second message bearing medium when placed on said panel portion of the protective cover panel covers said first message bearing medium to prevent the first message bearing medium from being viewed through said panel portion of the protective cover panel.

7. A liquid crystal display unit as recited in claim 6, wherein said first message bearing medium is light transmissive except that a least one message provided on said first message bearing medium is opaque, and said second message bearing medium is opaque except that at least one message provided on said second message bearing medium is translucent.

8. A liquid crystal display unit as recited in claim 6, wherein said protective cover panel is relieved except at said panel portion of the protective cover panel to define a recess for said liquid crystal display panel.

9. A liquid crystal display unit for a camera comprising a liquid crystal display panel that is illuminated to facilitate viewing at least one message which can appear on said liquid crystal display panel, and a back light source panel arranged along a back side of said liquid crystal display panel to illuminate the liquid crystal display panel, is characterized in that:

said back light source panel has a panel portion that extends farther than said back side of the liquid crystal display panel to be located beyond said back side in order to provide illumination other than to said back side when said back light source panel illuminates said liquid crystal display;

a transparent protective cover panel covers a front side of said liquid crystal display panel to view said liquid crystal panel through said protective cover panel and has a panel portion that extends farther than said front side of the liquid crystal display panel to cover said panel portion of the back light source panel in order to permit illumination from said panel portion of the back light source panel to shine through said panel portion of the protective cover panel; and a message bearing medium is arranged on said panel portion of the protective cover panel to be illuminated via said panel portion of the back light source panel in order to facilitate viewing through said panel portion of the protective cover panel at least one message provided on said message bearing medium when said back light source panel illuminates said liquid crystal display.

* * * * *